United States Patent [19]
Phillips et al.

[11] 3,748,635
[45] July 24, 1973

[54] AIRCRAFT SUBMERGENCE DETECTOR

[75] Inventors: John J. Phillips, Rolling Hills, Calif.;
Gerald J. Posakony, Boulder, Colo.;
Roger C. Stephenson, Woodland Hills, Calif.

[73] Assignee: G & H Technology, Inc., Santa Monica, Calif.

[22] Filed: Aug. 5, 1971

[21] Appl. No.: 169,364

[52] U.S. Cl. ............... 340/1 L, 340/59, 340/244 R
[51] Int. Cl. ............................................. G01s 9/66
[58] Field of Search ................... 340/1 L, 27 R, 59, 340/244 R

[56] References Cited
UNITED STATES PATENTS
3,656,134  4/1972  Brown ............................. 340/244 R
3,407,398  10/1968  Stearn ............................. 340/244 R

*Primary Examiner*—Richard A. Farley
*Attorney*—Dan R. Sadler

[57] ABSTRACT

A system is disclosed for detecting the presence of a fluid. The present detection system is shown on an aircraft and is effective to detect flooding of the aircraft as occurs when the aircraft is submerged in water. The present detection system includes a sensor which has transducer means for transmitting and receiving energy such as ultrasonic energy through an air space which may fill with the water. The energy has entirely different propagation characteristics; i.e., attenuation and velocity through air and water whereby the changes in the transmission of the ultrasonic energy indicates whether the air space has filled with water.

8 Claims, 5 Drawing Figures

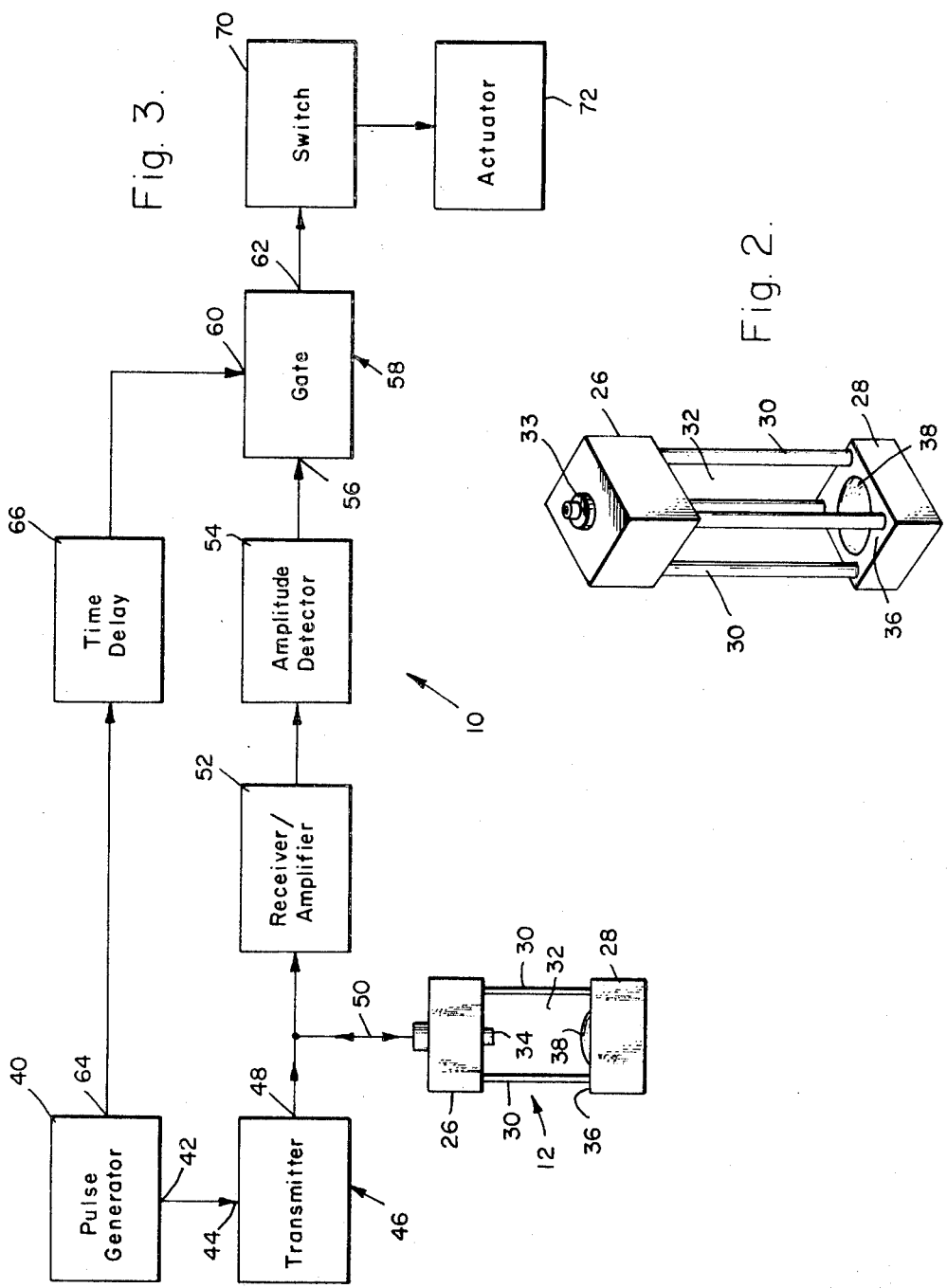

AIRCRAFT SUBMERGENCE DETECTOR

BACKGROUND

It is frequently desirable to detect the presence of a particular medium or changes in the medium present at a particular location. For example, it may be necessary to know when a fluid is present and/or the amount of the fluid and whether it has reached a particular level. It is important to know the water level in the bilge of a boat, the level of a liquid in a tank, etc., and to produce a signal when the level reaches a particular level. Normally, this can be accomplished by providing a float or similar device which rides on the liquid and actuates a switch when the liquid reaches a predetermined level. Although such an arrangement is useful for many applications, under some circumstances it is necessary to have an extremely reliable device capable of operating in an extremely short interval of time. However, the device must be unambiguous in that it will not operate when there is no liquid present. This is true even though the device is subjected to operating in a very severe environment.

If an aircraft accidentally lands in the water and begins to sink, it is essential this condition be detected as rapidly as possible and certain actions be taken. For example, the aircraft canopy must be opened, the pilot must be released from his seat, any floats, etc., must be inflated, etc. This is especially true where the pilot or other persons are unconscious or otherwise unable to take the necessary action. Although the device must react reliably it must not operate under any other conditions such as the presence of moisture, condensation, ice, etc.

SUMMARY

The present invention provides means for overcoming the foregoing difficulties. More particularly, the present invention provides means for reliably and quickly detecting the presence of a fluid such as water without being actuated by other substances such as condensation, moisture, ice, etc. In the limited number of embodiments disclosed herein, this is accomplished by providing a probe or sensor which has an open space into which the fluids may flow. Transducer means are provided for transmitting some form of energy such as ultrasonic into the space and to receive the energy after it has passed through the space. A receiver is responsive to the changes in propagation of the energy through the space. More particularly, the receiver is responsive to variations in the attenuation and/or time delay which results in the energy passing through the different mediums within the space.

DRAWINGS

FIG. 2 is a view of a sensor embodying one form of the present invention;

FIG. 3 is a block diagram of a system embodying the sensor of FIG. 2;

DESCRIPTION

Figure 1:
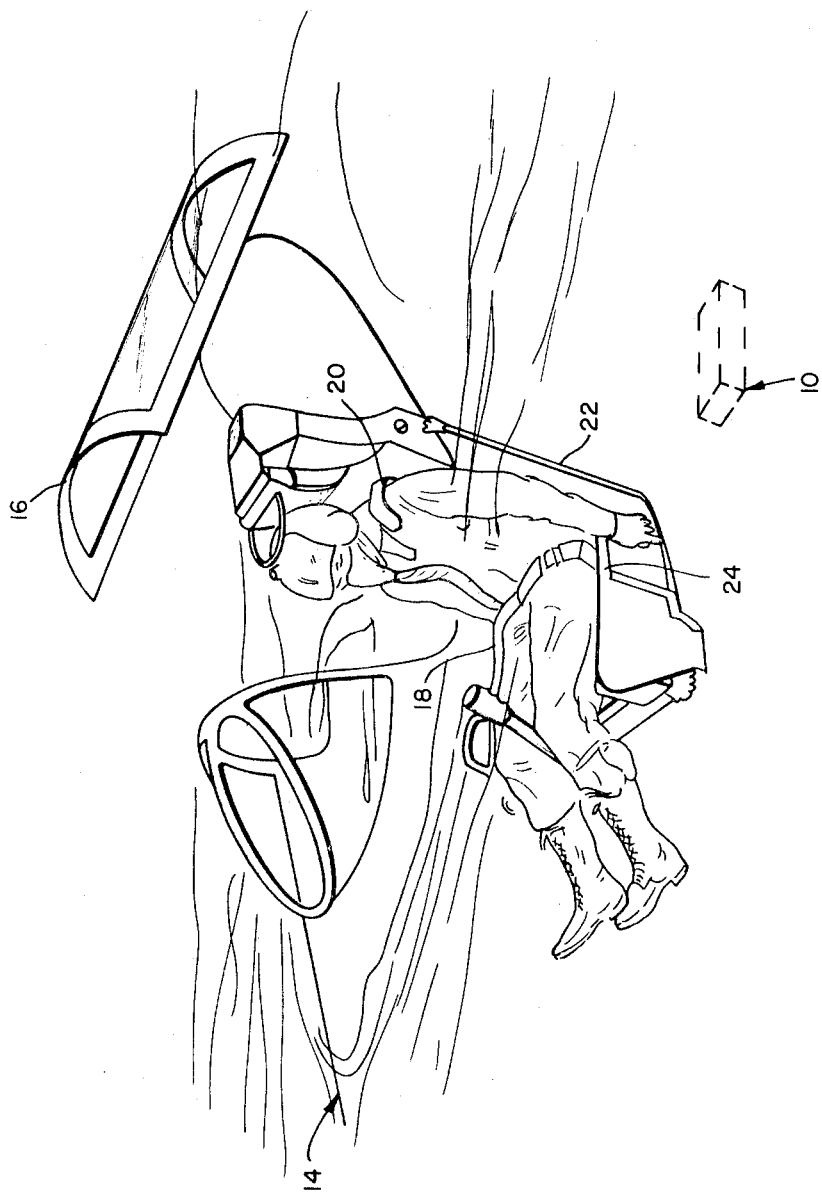
FIG. 1 is a fragmentary view of an aircraft which is submerged in the water and is sinking.

Referring to the drawings in more detail, the present invention is particularly adapted to be embodied in a fluid detection system 10. The system 10 includes a probe or sensor 12 which is adapted to be located at a point where it is desired to detect the presence of a fluid.

Although the fluid to be detected may be of any desired variety, in the present instance, by way of example, it is especially adapted to detect the presence of a liquid such as water.

In addition, although this sensor and system may be used at any kind of location, in the present instance, again by way of example, it is especially adapted for use on an aircraft 14 and particularly for detecting when the aircraft 14 is submerged in water.

The present fluid detection system 10 is adapted to be mounted on an aircraft 14 to detect when the aircraft 14 is in the water such as occurs when the aircraft has accidentally landed in the water. The system 10 is designed to actuate whatever equipment is necessary or desirable for such a situation. For example, as may be seen in FIG. 1 the equipment may jetison the aircraft canopy 16, release the various restraints 18-20 holding the pilot in his seat 22, inflate a suitable float 24, etc.

It should be borne in mind it is essential a system of this nature operate reliably whenever it is needed and conversely, it should never operate when it is not needed. Equipment of this nature installed on the aircraft 14 is subjected to an adverse environment. It is common for condensation to collect, for rainwater and moisture from fog to be present, for icing of the parts to occur, etc. If the system 10 malfunctions by responding to any of these conditions and prematurely operates some equipment while the aircraft is under normal operating conditions, the results could be catastrophic.

The present system 10 includes a probe or sensor 12 which is adapted to be mounted on the aircraft 14 to detect the presence of water. The sensor 12 is installed on the aircraft 14 at a location which will be exposed to the water as soon as the aircraft 14 has accidentally landed in the water. The aircraft 14 will usually be in the right-side-up position as seen in FIG. 1. Accordingly, the sensor 12 is mounted in the lower part of the aircraft 14.

Under some circumstances it may be desirable to provide a plurality of sensors. This provides a redundancy which insures a positive detection of the water as fast as possible by insuring at least one of the sensors being flooded immediately. Also, by placing one or more sensors on the top of the aircraft 14 the water will be detected immediately, even if the aircraft 14 lands upside down.

The sensor 12 may be mounted on the outside of the aircraft. However, in order to protect the sensor from damage as a result of striking objects, etc., and also to reduce aerodynamic drag, etc., it has been found desirable to place the sensor 12 inside of the aircraft 14. By way of example, the sensor 12 may be mounted in a small compartment located just inside of the skin of the aircraft 14. The compartment is vented to the outside whereby it will instantly flood and fill with water if the aircraft is submerged in the water. However, it is sealed to prevent the entrance of moisture, etc., into the interior of the aircraft.

Although the sensor 12 may be of any desired variety, in this embodiment it is adapted to transmit some form of energy across or through at least a portion of the compartment and to receive the energy after it has traversed the portion of the compartment. The energy is of a variety which has propagation characteristics in air which are substantially different from those in water.

By way of example, it has been found that ultrasonic energy is ideally suited for this prupose. The velocity of ultrasonic energy through water is on the order of four times faster than its velocity in air. The attenuation of ultrasonic energy in water is substantially independent of frequency. However, the attenuation in air is a function of frequency. As the frequency increases, the attenuation increases, and above a few hundred kilocycles the attenuation becomes very severe. Accordingly, if the frequency is on the order of several hundred kilocycles up to several megacycles, the attenuation in air is very much greater than the attenuation in water.

As a result, by employing ultrasonic energy it is possible to readily distinguish between the transmission of the ultrasonic energy through water and through air by a compairson of the differences in the time delay and, if the frequency is sufficiently high, by a comparison of the differences in the attenuation losses.

The present sensor 12 includes a first block or head 26, a second block or base 28 and a plurality of spacers or columns 30. The columns 30 are all secured to the head 26 and base 28 to secure them all together to form a single, rigid structure. The two blocks 26 and 28 are disposed substantially parallel to each other with an open space 32 therebetween. The length of this space 32 is not believed to be particularly critical but, by way of example, may be on the order of 2-½ inches. Normally, this space 32 is completely, or substantially completely empty. However, if the aircraft 14 is submerged in water, this space 32 will quickly and completely fill with water.

An ultrasonic search unit or transducer 34 is mounted in the head 26 of the sensor 12. This includes a device such as a piezoelectric crystal which transmits ultrasonic energy in response to an electrical signal being applied thereto. In addition, the crystal is of a reciprocal nature and produces an electrical signal corresponding to any ultrasonic energy incident thereon.

The transducer 34 is mounted on the head 26 to transmit the ultrasonic energy into the space 32 between the columns 30. The transducer 34 is aligned with the surface 36 of the base 28. The energy incident upon the surface 36 of the base 28 reflects back towards and is received by the transducer 34. Although the exposed surface 36 of the base 28 may be of any desired variety, it has been found desirable to provide a small projection 38 having a somewhat convex surface. This will prevent a "puddle" of water collecting on the surface 36 and/or freezing.

The means for operating the sensor 12 is best seen in FIG. 3. This includes a clock or pulse generator 40 which determines the rate at which the entire system 10 operates. The pulse generator 40 is normally of a free-running variety such as a multivibrator. It produces a series of timing pulses occurring at the desired repetitious rate. The repetition rate is not believed particularly critical and may be on the order of a few cycles per second on up to a few kilocycles per second or higher.

One output 42 of the pulse generator 40 is coupled to the control input 44 on a transmitter 46. The transmitter 46 is responsive to the timing pulses from the generator 40 and produces a driving signal each time a timing pulse occurs.

The driving signal is suitable for energizing the transducer 34 and is normally a signal having some predetermined frequency. The frequency of the signal is not believed to be particularly critical, but, as described in more detail subsequently and by way of example, it may be on the order of 5 megacycles per second.

The output 48 of the transmitter 46 is coupled to the transducer 34 by a suitable transmission line such as the coaxial cable 50. Each time the pulse generator 40 produces a timing pulse, the transmitter 46 applies a corresponding driving signal to the transducer 34.

The transducer 34 which is responsive to the driving signal in turn radiates or transmits a burst or pulse of ultrasonic energy. The time, duration and frequency of this ultrasonic energy corresponds to the driving signal. The pulse of ultrasonic energy radiates from the transducer 34, traverses the empty space 32 between the two blocks 26 and 28, strikes the exposed surface 36 on the base block 28 and reflects back to the transducer 34. The transducer 34 in turn produces an electrical signal corresponding to the received ultrasonic energy.

The timing of the electrical signal produced by the transducer 34 is a function of the flight time required for the ultrasonic energy to traverse the space 32 between the two blocks 26 and 28 and return. The amplitude of the signal produced by the transducer 34 is a function of the amplitude of the received ultrasonic energy. Both of these are in turn functions of the propagation velocity and attenuation loss in the medium present in the space 32 between the two blocks 26 and 28.

The transducer 34 is in turn coupled to a receiver 52 by the coaxial cable 50. The receiver 52 is adapted to receive the electrical signal produced by the transducer 34 and amplify the received signal by some predetermined amount of gain.

The signal output of the receiver 52 is coupled to an amplitude detector 54. This detector 54 is effective to suppress all signals which have an amplitude less than some predetermined cut-off level. However, in the event a signal exceeds this cut-off level, the signal will be passed through the detector 54.

The output of the detector 54 is in turn connected to the signal input 56 of a gate 58. When a signal is present on the control input 60 of the gate 58, the gate 58 is "OPEN" whereby any signals present on the signal input 56 will pass directly through the gate 58 to the output 62. However, if there is no signal present on the control input 60, the gate 58 is "CLOSED" and no signals will reach the output 62.

The control input 60 for the gate 58 is coupled to a second output 64 of the pulse generator 40 by means of a time delay 66. The time delay 66 may be a device such as a monostable multivibrator or a pair of such multivibrators. It is responsive to the timing pulses from the generator 40 and produces a square wave gating pulse. The gating pulse commences a predetermined, fixed time after the occurrence of the timing pulse from the pulse generator 40. The gating pulse also persists for some predetermined, fixed interval of time.

Thus, each time the generator 40 produces a timing pulse, the gate 58 will "OPEN" after some predetermined time and remain "OPENED" for some predetermined time interval. It will thereafter be "CLOSED" until the next timing pulse. As a consequence, only those signals which are produced by the transducer 34 and have an amplitude in excess of the cut-off level of the detector 54 and have a time occurrence which is coincident with the interval when the gate 58 is "OPEN" will be passed to the output of the gate 58.

The output 62 of the gate 58 is in turn coupled to a suitable device such as a switch 70. When a signal passes through the gate 58 the switch 70 will be actuated. The switch 70 in turn is coupled to suitable utilization devices such as an actuator 72. By way of example, the utilization devices are effective in proper sequence to release the aircraft canopy 16, free the pilot from any restraints which hold him in his seat and/or interfere with his leaving the aircraft (i.e., parachute harness 20, seat belts 18, etc.) and eject the pilot from the aircraft 14 by inflating a float such as his seat pack, etc.

In order to use the device for detecting the submergence of the aircraft 14, the entire system 10 is turned "ON" prior to the time the aircraft 14 is placed in service. During normal operation the open space 32 in the sensor 12 (i.e., the space 32 between the transducer 34 and the surface 36) is filled with air and completely unobstructed.

The pulse generator 40 produces a series of repetitively occurring timing pulses. Each timing pulse triggers the transmitter 46 whereby a corresponding driving signal is applied to the transducer 34. The transducer 34 in turn transmits a corresponding pulse of ultrasonic energy.

The ultrasonic energy travels across the space 32 in the sensor 12, strikes the reflecting surface 36 on the base 28 and reflects back to the transducer 34. The transducer 34 in turn produces a corresponding electrical signal.

If the open space 32 is filled with air, the velocity of propagation will be on the order of 343 meters per second at 20° C. The attenuation is a function of the frequency: The higher the frequency, the greater the attenuation. It has been found that at a frequency of 5 megacycles per second, the ultrasonic energy is very severely attenuated and the resultant received signal through an air path is virtually non-existent. Moreover, at this frequency the crystal in the transducer 34 is sufficiently thick to be rugged, etc. As a result, as long as the space 32 is filled with air, the signal coupled to the receiver 52 will have very little, if any, amplitude and it will be late in occurring.

Under some circumstances there may be moisture such as condensation, etc., in and around the sensor 12. However, even if this moisture fills a major portion of the space 32, as long as there is even a relatively small amount of open air space at a frequency of 5 megacycles per second, there will be an extremely large amount of attenuation. Moreover, at this frequency even if the space is filled with heavy fog, etc., the attenuation will be great.

However, if the space 32 is completely filled with water (such as will only occur when the aircraft is submerged) the propagation velocity across the space 32 will be on the order of 1,480 meters per second at 20° C and the attenuation losses will be relatively small. As a consequence, under these circumstances the signal from the transducer 34 will be earlier and of a very large amplitude.

The velocity at which the ultrasonic energy travels through ice is faster than its velocity in water. However, this difference is not as great as it is for air. As a consequence, the signal produced when the space 32 is filled with ice will occur somewhat sooner than a signal produced by water. However, the attenuation losses in ice are on the order of at least 30 DB greater than the losses in water at the frequencies involved. Therefore, even though a signal resulting from ice may occur at roughly the same time as a signal resulting from water, the amplitudes of the two signals will be of entirely different magnitudes.

The signal produced by the transducer 34 is coupled over the coaxial cable 50 to the receiver amplifier 52 where it is received and amplified. The amplified signal is in turn coupled to the amplitude detector 54. If the amplitude of the signal is less than the critical cut-off level, it will not pass through the amplitude detector 54. However, if it exceeds the critical level, it will pass through the detector 54.

The critical cut-off level is normally set at a level which is somewhat less than the level of a signal produced when the space 32 is filled with water. More particularly, the cut-off level is set in excess of the level which would be produced by air or even ice but less than that produced by water.

As a consequence, if and only if the space 32 is completely filled with water, will a signal pass through the amplitude detector 54. All other signals will be suppressed.

If a signal is passed through the amplitude detector 54 it is coupled to the signal input 56 of the gate 58. The gate 58 is normally "CLOSED" whereby the signals are blocked from passing therethrough. The gate is only "OPEN" when a signal from the time delay 66 is present on the control input 60. The time delay 66 is set such that the gating pulse will occur over a short time interval which just includes the time a signal would be produced if the space 32 were filled with water.

Thus, if the signal is produced while the sensor 12 is completely filled with water, the signal will occur when the gate 58 is "OPEN" and will pass through the gate 58 to the switch 70. However, if the sensor 12 is filled with air, ice or a combination of air, ice or water, the signal will occur outside of the time period the gate 58 is "OPEN" and as a consequence, no signal will pass through the switch 70.

It will thus be seen that only during the unique event when the sensor 12 is completely filled with water will the switch 70 operate the actuator 72. At all other times the signals will be blocked by the amplitude detector 54 and/or the gate 58.

The present system 10 includes amplitude detector 54, a gate 58 and a switch 70. These are included in the present instance to illustrate the invention. The use of all these elements provides a high degree of reliability. However, as a practical matter, in many instances it is not necessary to employ all of them. The differences in the amplitudes of the signals are of very large magnitude. For example, the difference between ice and water is 30 DB. Accordingly, the receiver 52 may be connected directly to the switch 70. The gain of the receiver is then set at a level which will only activate the switch 70 when water fills the space 32. Although this operates satisfactorily, it has been found the addition of the gate 58 forecloses the possibility of stray noises occurring outside of the proper time interval passing through the system and causing a premature operation. Also, the use of the amplitude detector 54 forecloses the possibility of a stray signal passing through the system.

The foregoing arrangement has proved to be very reliable in operation. However, under some circumstances an object or interface may become disposed between the two blocks 26 and 28 whereby the ultrasonic energy is reflected from the interface. For example, a layer of ice or drop of water across the end of the transducer may be so disposed that the ultrasonic energy reflects and/or "rings" within the ice or water. If the conditions are proper this may result in a signal of the correct time and amplitude to pass through the gate 58.

Figure 4:
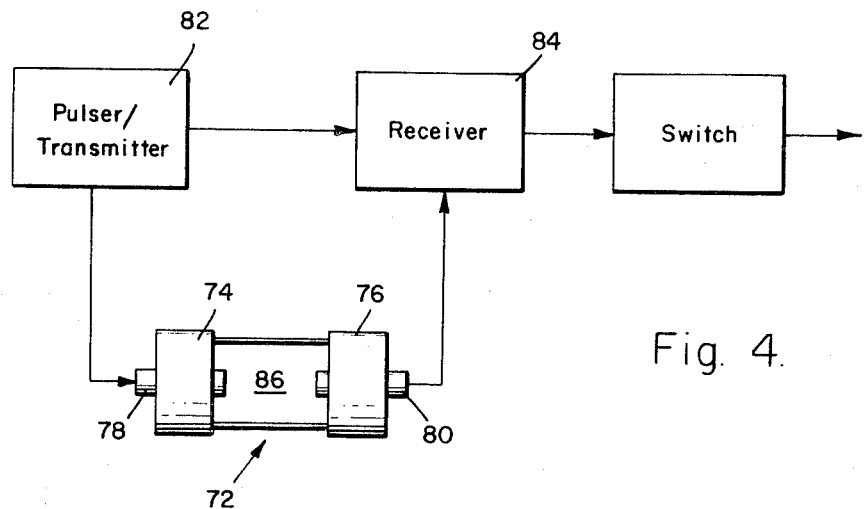
FIG. 4 is a view of a sensor and block diagram of a system embodying another form of the invention.

If this is an objectionable risk the embodiment of FIG. 4 may be employed. In this arrangement the sensor 72 and a pair of mounting blocks 74 and 76 similar to those in the foregoing embodiment are provided. However, instead of a single transducer two transducers 78 and 80 are provided. The two transducers 78 and 80 are aligned with each other. As a consequence, they transmit the energy from one transducer 78 to the other transducer 80.

The transmitting transducer 78 is coupled to a pulser transmitter 82. This is effective to cause the transducer 78 to repetitively transmit pulses of ultrasonic energy the same as the pulse generator 40 and transmitter 46 cause the transducer 34 to transmit pulses.

The receiving transducer 80 is coupled to a receiver 84. The receiver 84 is effective to receive the sginal produced by the transducer 80 as a result of the ultrasonic energy incident thereon. This receiver 84 may include a gate and/or amplitude detector similar to the gate 58 and/or detector 54 in the first embodiment.

The receiver 84 is coupled to the transmitter 82 whereby it will be synchronized therewith. Accordingly, it will only pass those signals which are produced by the ultrasonic energy traveling through water which completely fills the space 86 between the transducers 78 and 80.

It may be seen this embodiment works essentially the same as the first embodiment. However, instead of a pulse-echo type of transmission, a direct through form of transmission is employed.

Figure 5:
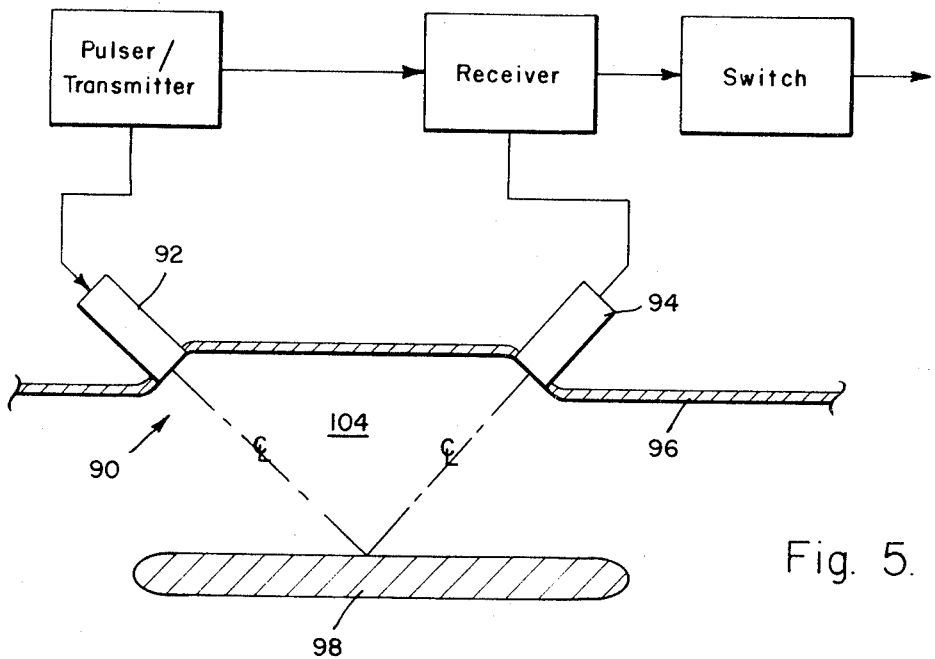
FIG. 5 is a combined view of a sensor and block diagram of a system embodying a further modification of the present invention.

Also as an alternative, the embodiment of FIG. 5 may be employed. In this embodiment the sensor 90 includes a pair of transducers 92 and 94 mounted on the skin 96 of the aircraft. The transducer 92 is aimed at some structure 98 such as a landing gear, strut, etc., located on the outside of the aircraft. This is arranged so as to transmit the ultrasonic energy toward the structure 98 so that it will reflect back to the transducer 94.

During normal operation the space 104 between the structure 98 and the transducers 92 and 94 is filled with air. However, in the event the aircraft should be submerged in water the space 104 will be filled with water whereby the signal will change as prescribed above.

We claim:

1. An aircraft submergence detector including the combination of,
   a sensor adapted to be mounted upon an aircraft in an exposed location,
   a normally open space in said sensor, said space being adapted to fill with water when said aircraft is down in the water,
   transducer means in said sensor communicating with said space, said transducer means being effective to transmit energy into said space in response to a driving signal, said transducer means being effective to receive said energy from said space and produce a signal corresponding to the received energy, the characteristics of the received energy and of the received signal corresponding to the medium in said space through which the energy travels,
   a transmitter coupled to the transducer means, said transmitter being effective to produce a driving signal for causing the transducer means to transmit said energy,
   a receiver coupled to the transducer means and responsive to the received signal,
   a gate in said receiver, said gate having an OPEN condition wherein said received signal passes through the gate and a CLOSED condition wherein said received signal does not pass through the gate,
   time delay means coupled to said transmitter and to said gate, said time delay means being effective to maintain the gate in said OPEN condition during the time interval the received signal will occur when said space is filled with a particular medium,
   amplitude responsive means in said receiver effective to only pass the received signal when the amplitude thereof is in the range which occurs when the said space is filled with said particular medium, and
   output means coupled to the gate and/or amplitude responsive means and responsive to the received signals passed therethrough.

2. The combination of claim 1 wherein
   said transducer means includes a transmitting transducer on one side of said space and a receiving transducer on the opposite side of said space.

3. The combination of claim 1 wherein
   a reflector is disposed in said space for reflecting the ultrasonic energy transmitted into said space by said transducer means back to said transducer.

4. The combination of claim 3 wherein
   said transducer means includes a first transducer for transmitting ultrasonic energy into said space and a second transducer for receiving ultrasonic energy returning from said reflector.

5. An aircraft submergence detector adapted to be mounted upon an aircraft for sensing when the aircraft is submerged in water and activate survival equipment when said detector is submerged, said detector including the combination of,
   a search unit adapted to be mounted on said aircraft, said search unit having a normally open space constructed and arranged to be filled with water when the aircraft is submerged in the water,
   ultrasonic transducer means in said search unit adapted to transmit and receive ultrasonic energy traversing said space,
   transmitter means coupled to said transducer means and effective to intermittently energize said transducer means whereby it transmits pulses of ultrasonic energy into said space,
   said transducer means being effective to receive ultrasonic energy from said space at a predetermined time after the transmission of said energy and with a predetermined amplitude when said space is completely filled with said water, said transducer means being effective to produce a signal corresponding in time and amplitude to said received energy, a receiver coupled to said transducer means for receiving said signal, gate means in said receiver coupled to said transmitter means and responsive only to signals of said amplitude occurring at said time, and actuating means coupled to said gate whereby said gate is effective to energize said actuating means.

6. An aircraft submergence detector adapted to be mounted upon an aircraft for sensing when the aircraft is submerged in water, and activating survival equipment when said detector is submerged, said detector including the combination of a search unit adapted to be mounted on said aircraft, said search unit having a normally open space constructed and arranged to be filled with water when the aircraft is submerged in the water, a first ultrasonic transducer in said search unit adapted to transmit ultrasonic energy into and across said space, transmitter means coupled to said first transducer and effective to intermittently energize said transducer whereby it intermittently transmits pulses of ultrasonic energy into and across said space, a second ultrasonic transducer in said search unit adapted to receive said ultrasonic energy after it has traversed said space, said transducer being effective to produce a signal at a predetermined time after the trans-mission of said pulse and with a predetermined amplitude when said space is completely filled with said water, a receiver coupled to said second transducer for receiving said signal, gate means in said receiver coupled to said transmitter means and responsive to signals only when they occur at said time and have said amplitude, and actuating means coupled to said gate whereby said gate is effective to energize said actuating means.

7. An aircraft survival device including the combination of, survival equipment to be carried on board said aircraft and deployed from said aircraft in the event it is down at sea, a search unit adapted to be mounted on said aircraft in an exposed location said search unit having a normally open space constructed and arranged to be filled with sea water when the aircraft is down at sea, ultrasonic transducer means in said search unit effective to transmit pulses of ultrasonic energy into said space and to receive said pulses of ultrasonic energy from said space, said received pulses occurring at a predetermined time with a predetermined amplitude only when said space is completely filled with said water, said transducer means being effective to produce a signal corresponding in time and amplitude to the received energy, a receiver coupled to said transducer means for receiving said signal, and actuating means in said receiver responsive only to signals of said amplitude occurring at said time, said actuating means being effective to deploy said survival equipment when said signals occur at said time and with said amplitude.

8. An aircraft submergence detector including the combination of, survival equipment to be carried on board said aircraft and deployed therefrom in the event the aircraft is down at sea, a search unit adapted to be mounted on said aircraft, said search unit having a normally open space constructed and arranged to be filled with sea water when the aircraft is down at sea, a first ultrasonic transducer in said search unit adapted to transmit ultrasonic energy, said transducer projecting into said space and being acoustically coupled directly thereto for transmitting ultrasonic energy into said space, a second ultrasonic transducer effective to receive said ultrasonic energy, said second transducer projecting into said space and being acoustically coupled directly thereto for receiving said energy from said space at a predetermined time with a predetermined amplitude only when said space is completely filled with said water and to produce a signal corresponding thereto, a receiver coupled to said transducer means for receiving said signal, and means in said receiver responsive only to signals of said amplitude occurring at said time for deploying said survival equipment.

* * * * *